(12) United States Patent
Mombourquette et al.

(10) Patent No.: US 10,979,465 B2
(45) Date of Patent: Apr. 13, 2021

(54) CLOUD-BASED COMMUNICATION SYSTEM FOR MONITORING AND FACILITATING COLLABORATION SESSIONS

(71) Applicant: Mitel Networks (International) Limited, London (GB)

(72) Inventors: Darren Mombourquette, Nepean (CA); Mona Abou-Sayed, Frisco, TX (US); Anders Fahrendorff, Ottawa (CA); Logendra Naidoo, Ottawa (CA)

(73) Assignee: Mitel Networks (International) Limited, London (GB)

( * ) Notice: Subject to any disclaimer, the term of this patent is extended or adjusted under 35 U.S.C. 154(b) by 0 days.

(21) Appl. No.: 17/000,133

(22) Filed: Aug. 21, 2020

(65) Prior Publication Data
US 2021/0058436 A1 Feb. 25, 2021

Related U.S. Application Data

(60) Provisional application No. 62/922,710, filed on Aug. 23, 2019.

(51) Int. Cl.
*H04L 29/06* (2006.01)
*G06K 9/00* (2006.01)
*H04M 3/56* (2006.01)
*H04N 7/15* (2006.01)

(52) U.S. Cl.
CPC ...... *H04L 65/1083* (2013.01); *G06K 9/00302* (2013.01); *G06K 9/00711* (2013.01); *H04L 65/403* (2013.01); *H04L 65/4015* (2013.01); *H04L 65/80* (2013.01); *H04M 3/568* (2013.01);

(Continued)

(58) Field of Classification Search
CPC combination set(s) only.
See application file for complete search history.

(56) References Cited

U.S. PATENT DOCUMENTS

| 7,675,873 B2 * | 3/2010 | Krstulich | H04M 3/4872 370/260 |
| 10,318,096 B2 | 6/2019 | Bhardwaj et al. | |

(Continued)

FOREIGN PATENT DOCUMENTS

| CN | 108932951 A | 12/2018 |
| CN | 110464367 A | 11/2019 |

*Primary Examiner* — Duc Nguyen
*Assistant Examiner* — Assad Mohammed

(57) ABSTRACT

A cloud-based communication system for monitoring a collaboration session. Based on the monitoring, the system identifies a collaboration event that indicates desirability of a break or that a digression from a session topic has or is occurring. When a collaboration event is identified, a prompt is communicated to the facilitator of the collaboration session. The collaboration event may be defined in a variety of ways such as participant fatigue, participant distraction, or the like. The system provides the facilitator with actions to be initiated by the system (automatically or in response to facilitator/user input) to respond to an identified communication event. The actions include initiating a break, acting to avoid or reduce session digressions, and creating a highlight reel of the collaboration session, including a number of unique features enabling more efficient retrieval and/or review of data. A distracted or fatigued participant can be directed to access the highlight reel.

12 Claims, 5 Drawing Sheets

(52) U.S. Cl.
CPC ........ *H04N 7/155* (2013.01); *H04M 2201/40* (2013.01)

(56) References Cited

U.S. PATENT DOCUMENTS

| | | | |
|---|---|---|---|
| 2006/0031290 A1* | 2/2006 | Mannaru | H04N 7/15 709/204 |
| 2012/0224021 A1* | 9/2012 | Begeja | H04N 7/155 348/14.08 |
| 2012/0300658 A1* | 11/2012 | Sloyer | H04L 65/80 370/252 |
| 2013/0339431 A1* | 12/2013 | Yannakopoulos | H04L 12/1827 709/204 |
| 2014/0063174 A1* | 3/2014 | Junuzovic | H04N 7/15 348/14.02 |
| 2014/0280602 A1* | 9/2014 | Quatrano | H04L 67/02 709/205 |
| 2015/0154291 A1 | 6/2015 | Shepherd et al. | |
| 2017/0154637 A1* | 6/2017 | Chu | G09B 21/006 |
| 2018/0213013 A1* | 7/2018 | Adams | H04L 65/403 |
| 2019/0188604 A1* | 6/2019 | Amitava | G06N 20/00 |
| 2020/0092339 A1* | 3/2020 | Rakshit | G10L 21/003 |
| 2020/0106813 A1* | 4/2020 | Vendrow | G06F 16/48 |
| 2020/0106988 A1* | 4/2020 | Harpur | H04L 12/1831 |

\* cited by examiner

CLOUD-BASED COMMUNICATION SYSTEM FOR MONITORING AND FACILITATING COLLABORATION SESSIONS

CROSS-REFERENCE TO RELATED APPLICATION

This application claims the benefit of U.S. Provisional Application No. 62/922,710, filed Aug. 23, 2019, and entitled METHODS FOR COLLABORATING AND COMMUNICATING IN MEETING ENVIRONMENTS, the contents of which are hereby incorporated herein by reference, to the extent such contents do not conflict with the present disclosure.

FIELD OF THE INVENTION

The present disclosure generally relates to electronic communication methods and systems including those utilizing the Internet and cloud-based solutions. More particularly, examples of the disclosure relate to electronic communication methods and systems that can monitor and manage (or "facilitate") a collaboration sessions involving two-to-many participants via client device communicatively coupled to a digital communications network.

BACKGROUND OF THE DISCLOSURE

Mobile and web applications allow users, such as operators of smartphones and other portable computing devices as well as tablets, laptop, notebook, and desktop computers, to perform a wide range of communication functions. In recent years, individuals and companies have more increasingly relied upon conferencing, audio and/or video, to allow people who have access to a communications network via a computing or client device but at various differing and remote locations to collaborate to achieve a desired result or to hold a "collaboration session" or meeting. For example, employees of a company with numerous office locations may have a cloud-based meeting using video conferencing. Online education has also grown in popularity and relies heavily remote learning that involves a teacher or facilitator to teach a group of students at a variety of remote locations, and this may be thought of as a collaboration session involving the teacher and students.

Numerous tools, including new devices and software applications, have been developed to support such collaboration sessions or meetings. Most of these tools, though, have been designed to support online meetings that often simply replicate conventional face-to-face meetings. The tools may enhance the ability of meeting participants to share information with each other. However, the tools have yet to be fully leveraged to increase the likelihood of a more productive collaboration session for the person running the meeting (e.g., a facilitator or leader) and for the people attending the meeting (e.g., the session participants). Hence, there remains a need for improved tools or systems for improving network-based collaboration sessions.

Any discussion of problems provided in this section has been included in this disclosure solely for the purposes of providing a background for the present invention and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

Figure 1:
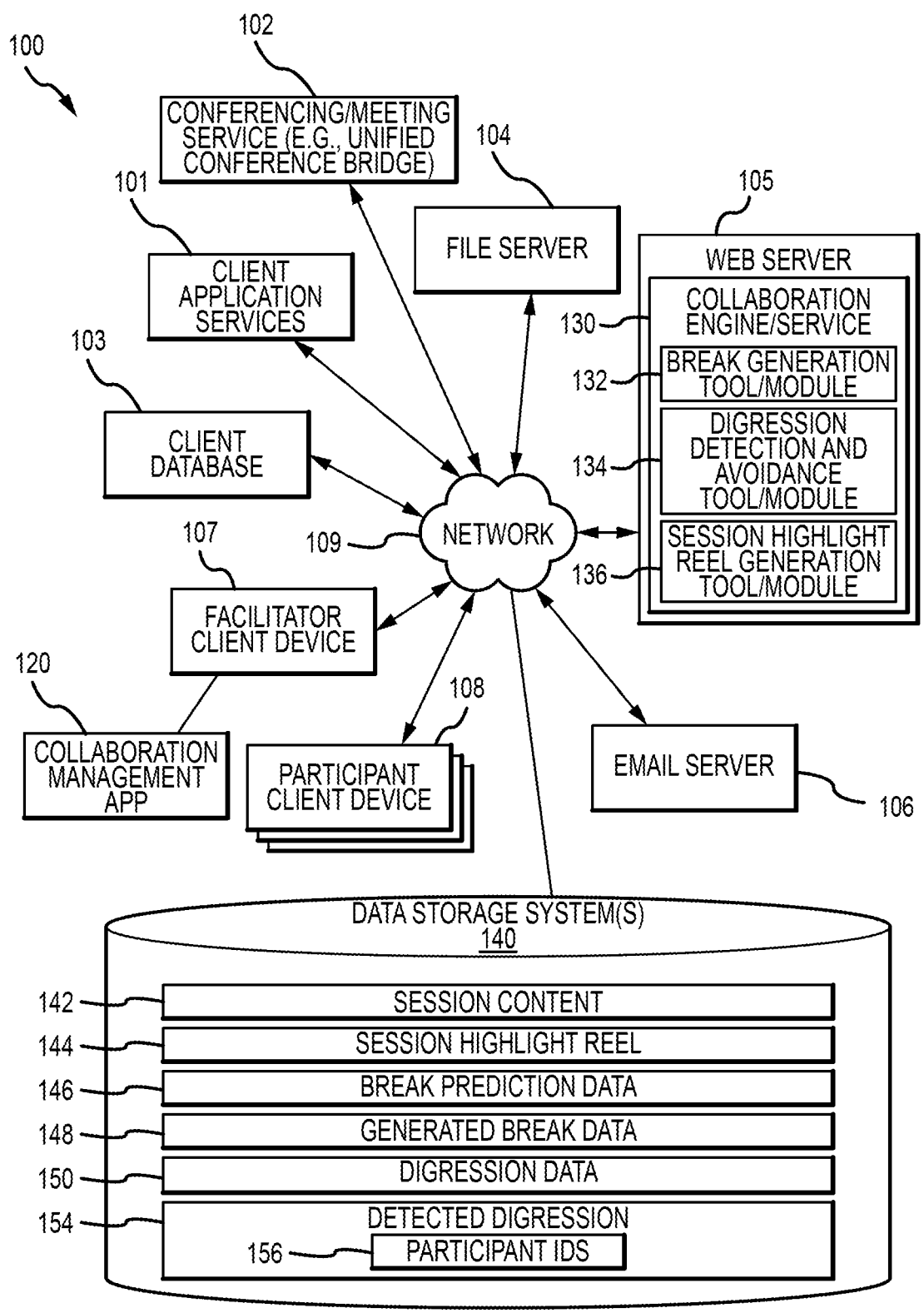
FIG. 1 illustrates an electronic, cloud-based communication system adapted to provide monitoring and management of a live collaboration session (e.g., a web-based meeting or audio/video conference) in accordance with exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is nor intended to limit the scope of the invention disclosed herein. Moreover, recitation of multiple embodiments having stared features is not intended to exclude other embodiments having additional features or other embodiments incorporating different combinations of the stated features.

As set forth in more detail below, exemplary embodiments of the disclosure relate to electronic or cloud-based communication systems, and corresponding methods performed by such systems, that can, for example, facilitate collaboration sessions (e.g., audio and/or video conferences or meeting), which are held via a communications network or that are cloud based, to increase the productivity and effectiveness of the sessions, the facilitator or leader, and the session participants.

In brief, the cloud-based communication system can be adapted for monitoring a collaboration session. Based on the monitoring, the system may act to identify a collaboration event that indicates: (a) a desirability of an icebreaker or a break or (b) a diversion from a topic of the collaboration session. When such a collaboration event is identified by the system, a prompt is generated that is communicated to the facilitator or administrator of the collaboration session (e.g., in the graphical user interface (GUI) of their client device). As will be understood from the following description, the system may include a variety of tools for detecting the collaboration event (which may be defined in a variety of ways such as participant fatigue, participant distraction, or the like). The system may provide the facilitator with one or more actions that can be initiated by the system (automatically or in response to facilitator/user input) to respond to an identified communication event including creating a highlight reel of the collaboration session (including a number of unique features enabling more efficient retrieval and/or review of data (audio, video, presentations, and so on)) and directing a distracted and/or fatigued one of the participants to access the highlight reel to enable them to once again become effective participants in the collaboration session.

The inventors recognized that meetings and other collaboration sessions become less productive the longer they get drawn out. Often, it is subjective when a break should be called to allow the meeting participants to re-energize to be able to more effectively continue to participate in the meeting or collaboration session. In the past, breaks were fixed by the clock with them being called every forty-five or sixty minutes or when the meeting facilitator observes that the participants are appearing lethargic or lacking enthusiasm.

Both of these approaches to calling a break are lacking. The dock-based approach may call breaks too late or when the session is at a very productive point (i.e., the break is counterproductive). Relying solely on the facilitator is ineffective as many people have difficulty concentrating on the presentation or session content while trying to be observant of all individuals to identify a need for a break. For example, an existing meeting approach calls for the facilitator to decide when there is an opportunity for a break or for introducing an icebreaker (e.g., a portion of re-energizing or uplifting content such as a cartoon, a humorous or entertaining short video, and so on). However, many facilitators will lack the ability to promptly respond to participants and will blindly stick to an meeting agenda, which runs the risk of going through the motions with little participant interaction so as to inefficiently run through meeting topics irrespective of the fact that the meeting participants are already distracted from fatigue, a desire for nourishment or a bathroom break, and so on. Arbitrary goals for meetings are a significant reason why employees and other collaboration session participants experience meeting fatigue and why more and more meetings are less productive.

The inventors further recognized that effectively communicating is crucial when collaborating as it connects people and allows the sharing of knowledge. Recently, with the rise of a pandemic, it became even more obvious that every work-from-home (WFH) organization needed to start exclusively conducting online audio/video conferences, meetings, study sessions, and so on (all "collaboration sessions" herein) to keep productivity thriving despite the allure of conveniences in the home office. Online collaborating offers a creative approach to sharing information. However, online conferences can suffer from bad habits like frittering away valuable collaboration time due to conversational digressions and distractions, which can make a routine meeting last much longer, can unnecessarily burden the participants, and can affect a company's budget and resources.

One of the biggest time wasting distractions is when any meeting or collaboration session gets off track or "off topic." It can happen very easily even in meetings that are going well and are productive, e.g., when people are actively participating and contributing to various ideas. It is important in many meetings to notice these distractions, such as a participant taking a discussion off on a tangent, and to avoid them in a more automated manner to enhance meeting productivity. Previously available techniques and systems are much more labor intensive that the presently taught system and method, and these involved intervention from a facilitator during the distraction in order for them to be activated and/or effective during the meeting. However, many of these systems relied heavily on the skill and experience of the facilitator in handling the tricky problem of knowing whether or not a perceived distraction is helpful for the current meeting agenda or is harmful (e.g., a time-wasting digression from topic) Due to this crucial subjective characterization, the facilitator may also end up being distracted by the prior systems while they are investigating the distraction.

Hence, the new system provides tools to the facilitator that provide them with completely automatic digression detection, including finding the distracted participants, during the meeting, and the system and its tools also can be configured to alert the facilitator about the distraction (and the associated participants). In this way, even if the digression from a topic is useful for the meeting, the tools provide the facilitator with the option to park the digressing conversation or side topic, which may involve scheduling a time for a separate collaboration session with the digressing conversation or side topic as its topic and invite the participant(s) associated with the digression to that collaboration session (as the facilitator in some cases).

With these issues in mind, the inventors designed a new communications system that is specially adapted to monitor a live or ongoing collaboration session (e.g., an online or cloud-based video conference or meeting) and to identify a collaboration event (e.g., desirability of a break in a meeting, a diversion from a session/meeting topic, or the like). In response, the new system operates to increase the efficiency of the meeting such as by providing a prompt to the facilitator via their client device regarding the collaboration event. This prompt may indicate a predicted time for a break, may indicate the distraction from topic (with those diverting sometimes being identified to the facilitator and/or separately prompted to return to topic), and may urge participants to access a highlight reel of the meeting (e.g., to quickly obtain content they may have missed while distracted, fatigued, absent, or the like).

Turning now to the figures, FIG. 1 illustrates an electronic, cloud-based communication system 100 in accordance with exemplary embodiments of the disclosure that is specially adapted to autonomously monitor and provide a facilitator assistance in running a live collaborative session. The system 100 generally includes, uses, or communicates with various client application services 101, a conferencing/meeting service (e.g., a unified conference bridge or the like for providing web audio/video conferencing) 102, a client database 103, a file server 104, a web server 105, an email server 106, client computing devices (e.g., an active or first user client device 107 operated by a facilitator or leader of a collaborative session run or hosted by service 102 and additional participant client devices 108 operated by people attending or participating in the collaborative session run by service 102), and a digital communications network 109 (providing a digital communications link between devices 107 and 108), among other components not shown or described for simplicity. In place of or in addition to the web server 105, a cloud micro services solution may be provided in the system 100, where modern design concepts relating to lambdas can be used, e.g., the present method and system concepts are not specific to the more legacy environments where hosted hardware servers are needed to execute complete applications. For example, web browser applications can be hosted in an Amazon S3 bucker (date store) and be delivered to the web browser for execution as a single page application or PWA.

Electronic communication system 100 includes a first client device 107 and a second participant client device(s)

108 coupled to a network 109 and cloud services and/or web server 105 with one more processors running or executing code to provide the functions of a collaboration engine or service 130. First device 107 and second device(s) 108 can be used to send electronic communications to each other and/or to other devices connected to network 109 and, in the system 100, are used to allow both to attend or participate in an online meeting or session run by service 102 (e.g., to hear and see audio and video and other digital content of a collaboration session or meeting). In the illustrated example, system 100 also includes communication cloud services (or servers in some cases) 101, 102, 104, and 106, which can be or include email cloud services, text cloud services, chat cloud services, or the like.

Devices 107, 108 can be or include any suitable device with wired or wireless communication features that can connect to network 109. For example, devices 107, 108 can include a wearable device, a tablet computer, a wired phone, a mobile phone, a personal (e.g., laptop or desktop) computer, a streaming device, such as a game console or other media streaming device, or the like. The active user or first client device 107 can include an application or client, such as a collaboration management application 120, to perform various functions set forth herein and/or to cause to be displayed text and/or other information as described herein including initiating operations of the collaboration engine/service 130 during a collaboration session run by service 102 (e.g., to display a configuration interface, to display digression or other prompts, to allow the facilitator to manually react to the prompts such as to initiate a break, to park a digressive topic/side chat, and the like).

To support processing and operations of the collaboration engine/service 130, the system 100 includes a data storage system 140 that is used by the engine/service 130 to store content of a monitored and managed collaboration session 142. As part of processing the content 142, the collaboration engine/service 130 may call or run a break generation tool/module 132, a digression detection and avoidance tool/module 134 and/or a session highlight reel generation tool/module 136. During operations of the system 100 during a collaboration session for which content 142 is captured, the break generation tool/module 132 acts to gather and process a set of break prediction data 146 (e.g., data indicative of participant fatigue, distraction, and the like that may be captured by the client device 108 running software and with (in some cases) added hardware (e.g., biometric components) and/or by other portions of the system 100 such as the email server 106 monitoring receipt/transmittal of emails during the session or by client application services 101 to identify side chats and so on).

Specifically, the break generation tool 132 processes the data 146 to predict when a break (which may include an icebreaker) would be useful to session productivity, and the tool 132 may also recommend a type of break to take at that time (e.g., a break for nourishment or to reenergize or a quick icebreaker-type break). Further, the tool may prompt a facilitator via the app 120 and a GUI in facilitator client device 107 that a break prediction has been made to allow the facilitator to manually choose the recommended break without modification or with some modification (e.g., a manual adjustment of timing of the break, its duration, and/or its type). In some cases, the break that is predicted as needed will be automatically initiated (without additional facilitator input) during the session by the tool 132.

Also, during operations of the system 100, the digression detection and avoidance tool/module 134 collects and processes a set of digression data 150 to determine whether or not one or more participants (operators of client devices 108) have become distracted from or have diverted from the topic of the ongoing collaboration session. The data 150 may be all or a portion of the session content 142 (e.g., for use in determining a present topic of the session or such a topic may be input by the facilitator (operator of client device 107) and/or for determining if in-session inputs have diverted from the session's topic), and the data 150 may further include data captured by the client device 108 (or apps running on this device 108) or other components of system 100 such as services 101 and the email server 106 to determine if the participants are involved in side chats or are otherwise discussing topics differing from the session's topic during the collaboration session/meeting. The tool/module 134 may act to identify a potential digression 154 and those participants 156 that are part of the detected digression 154. The tool/module 134 may be configured to, in response to detection of digression 154, to prompt the facilitator via the app 120 and/or the client device 107 (or its GUI) to warn them of the digression and its participants to allow them to communicate more effectively, with the identified participants 156 (e.g., "let's stay on topic," to identify the number of digressions detected (e.g., to show how many times these participants 156 have digressed from topic), and so on) or to initiate a park event (e.g., to schedule a time and topic for another meeting/collaboration session based on the identified digression 154 (as the topic)).

Further, during operations, the session highlight reel generation tool/module 136 functions to process the session content 142 along with its related data (as discussed below in the detailed description of highlight reel generation) to generate one or more session highlight reels 144, which can be accessed by the participant client devices 108 such as in response to a prompt from the digression detection and avoidance tool/module 134 provided to a participant (operator of a device 108) identified as being distracted during a portion of the session associated with the collected content 142 (or of missing a portion of the session).

The inventors believed it is desirable to include the session highlight reel generation tool/module 136 in the system 100 to solve identified problems with existing conferencing software and services. Today, a majority of all work-related meetings are conducted virtually over the Internet. The presenter (or facilitator) shares the content with the participants who interact with other participants using the embedded features of the shared conferencing platforms (e.g., service 102 in system 100). Usually, someone takes the minutes of meetings manually as it helps to record the proceedings when later making strategic decisions. The traditional capturing of meeting minutes does not, however, comprehensively capture the full context of the collaboration session. Particularly, the minutes do not track the online experience of each participant, e.g., a first participant is in a moving vehicle so has a particular session experience, there are collaboration-related events not in minutes (e.g., Person X started presenting on Topic Y at 8:53 AM and the like), and there are secondary observations not captured in typical minutes (e.g., ambient noise was detected from 9:15 AM to 9:32 AM for Participant Z). Even seemingly noncritical events that transpire during an online collaboration session can be useful in a highlight reel but are not captured in conventional meeting minutes (e.g., Participant N had dropped video between 8:33 AM and 8:45 AM and audio between 8:37 AM and 8:45 AM and so on).

The inventors recognized that participants often fail, after a meeting is over, to accurately capture information beyond the main content that may be useful for using and reviewing the session content 142. This may include key points, discussions, audio/video overview, public chat instances, and other simultaneous events, and all of this additional information may be included in or be used to generate the session highlight reel 144. Hence, the reader of conventional minutes misses these telling moments or characteristics of a session and, as a result, fails to remember what transpired other than who attended the session and key actions. Standard meeting captures, such as video and/or audio recordings do not convey the full story of a meeting including what may have been happening during the meeting other than the major and obvious events. Standard recordings of meeting are static and can actually become counterproductive because it remains unclear to the user what additional challenges or experiences the participants faced during the live meeting.

Network 109 can include or be, for example, an internet protocol (IP) network. Exemplary types of networks suitable for communication with network 109 can be or include a local area network, a wide-area network, a metropolitan area network, wireless networks, a private branch exchange (PBX), or a portion of the Internet. Various components of network 109 can be coupled to one or more other components using an Ethernet connection, other wired connections, and/or wireless interfaces. Network 109 can be coupled to other networks and/or to other devices typically coupled to networks. By way of particular example, network 109 includes a communication network, and network 109 can be coupled to additional networks that can be coupled to one or more devices, such as devices 107, 108, which may communicate via the service 102 during a collaboration session that may, in turn, capture (e.g., digitally record) the session content 142 (e.g., content for analysis and use by collaboration engine/service 130).

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Figure 2:
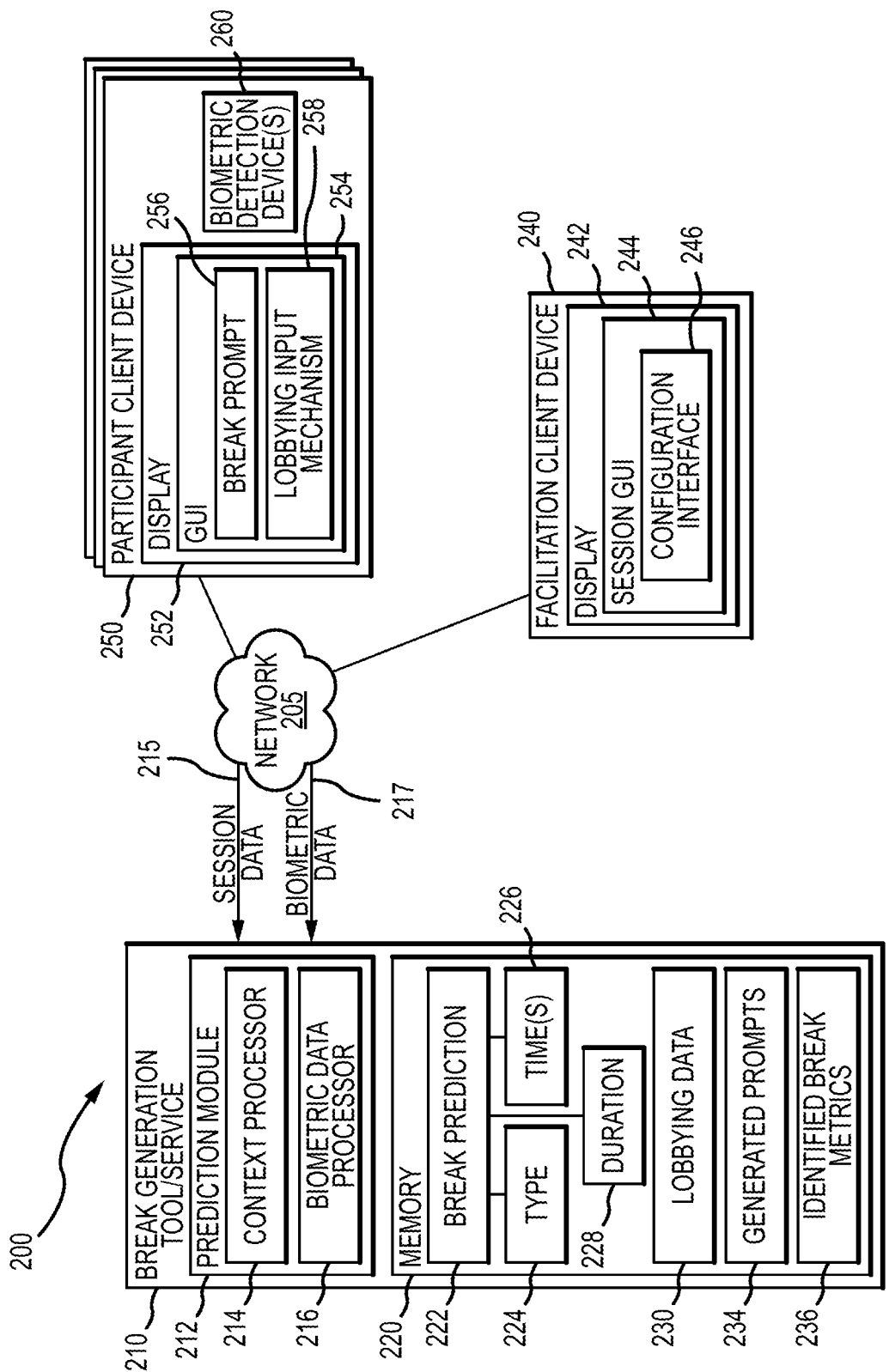
FIG. 2 illustrates a functional block diagram of a cloud-based communication system (e.g., a partial implementation of the system of FIG. 1) showing more detail of the break monitoring and prediction components.

FIG. 2 illustrates a functional block diagram of a cloud-based communication system (e.g., a partial implementation of the system of FIG. 1) 200 showing more detail of the break monitoring and prediction components. As shown, the system 200 includes a break generation tool or service 210 receiving session data 215 over a communications network 205 collected in the form of digital audio and video content for an ongoing meeting that involves a facilitator operating a facilitator client device 240 and one-to-many participants each operating one or more client devices 250. Additionally, the tool/service 210 receives gathered or sensed biometric data 217 from biometric detection devices 260 operating on or linked to client devices 250 (or separately providing the data 217 over network 205). The tool/service 210 includes one or more processors running code or executing instructions to provide the functionality of a prediction module 212, which includes a content processor 214 for processing the session data 215 and a biometric data processor 216 for processing the biometric data 217. The session data 215 may further include lobbing data 230 from the participant client devices 250 via operation of lobbing input mechanisms 258 provided in a GUI 254 on the device's display 252.

During operations of the system 200 (e.g., during a collaboration session that is being monitored), the prediction module 212 operates to generate break predictions 222 based on key or identified break metrics 236 that are indicative of a need for a future break in the session. In response, the prediction module 212 may operate to generate break-related prompts 234. These may be communicated over network 205 to the facilitator client device 240 for displaying within a configuration interface 246 in a GUI 244 provided on the client device's display 242. The prompts 234 may also include ones intended for participants, which may be provided as shown at 256 on in the participant GUIs 254 and indicate details of an upcoming break. In this regard, the break prediction 222 may define a type 224 of break (e.g., an intermission, an icebreaker, and so on), a time 226 for the break (e.g., in 10 minutes, in 5 minutes, at 11:30 AM, and so on), and a duration 228 for the break (e.g., 5 minutes, 10 minutes, 30 minutes, and so on to allow the participants to plan proper use of that upcoming break).

The system 200 is configured to implement methods that propose a system-level break for a live or ongoing collaboration session. These breaks 222 may be of a variety of types 224 such as an intermission, an icebreaker, or other types of useful breaks. The prediction is made based on key metrics 236 identified by the content processor 214 and/or the biometric data processor 216, which indicate, for example, that the meeting/session has gotten or is becoming monotonous (or inefficient). The module 212 is adapted to predict the point 226 at which the break 222 is required or would be likely to be useful or desirable for participants operating devices 250. Research shows that participants get comfort and enhanced productivity by collaborating and contributing content, ideas, and the like immediately or soon after an icebreaker-type break, but prior booking systems have never included such events in a meeting scheduler or similar tool.

The system 200 offers a configuration interface 246 to manually, in some cases, allow the facilitator themselves to predict when a break 222 (such as an icebreaker type) would be useful and/or such a prediction may be made by the prediction module 212 in a background and automated manner (as discussed above). For example, the facilitator via configuration interface 246 or module 212 may decide based on session content 215 that there are too many distractions. These may include metrics such as too many side chats (more than some predefined number, with chats detected by participants muting their microphone and talking to someone off camera, by identifying mumbling or soft talking in addition to a main speaker in session, and by other approaches), too much ambient noise, and the like identified by content processor 214 or the facilitator or such as too much fidgety or restless behavior identified by biometric data processor 216 or the facilitator. In response to the prediction 222, a break prompt 256 (e.g., indicating a time, type, and duration of a next break (e.g., an icebreaker)) may be sent by the system 200 to each participant's client interface 254.

To this end, the decision that a break 222 is desired can be pushed to the facilitator by way of system advisory messages or prompts to the session GUI 244 on client device 240. The system 200 can monitor biometric detection devices 260 and their output 217 with processor 216 during a collaboration session. This may include using a privacy filter (e.g., to use anonymous data) and/or using an aggregation function (e.g., to provide metrics 236 as collective measurements for all the participants) to ensure that the collective "fatigue" or other distraction is measured and reported in system 200. Data points 236 may include excessive sighing/yawning, arm movements, heart rate ranges, and the like.

Other measurements 236 can be pulled from the meeting environment in data 215 by content processor 214 such as ambient noise increases (which may be caused by participant fidgeting, counter-productive speech by participants such as side chats, and so on), browser habits/activities (distractions) indicated in data 215 (or other collected information) during the session, and precedence (e.g., approximation of an icebreaker being introduced based on same participants and historical analysis). In some embodiments, the prediction module 212 may autonomously introduce breaks 222 (e.g., icebreakers) based on detection of a collaboration event such as detected silence or when a certain number of participants collectively persuade the system to take a break ASAP or within a specified time (e.g., in 10 minutes) using a lobbying input mechanism 258 to provide lobbying data 230 to the module 212. More participants voting/lobbying for a break can be used by module 212 to trigger a notification, which may include a countdown clock, of the upcoming/predicted break 222 (e.g., icebreaker in 10 minutes or the like).

With system 200, meeting effectiveness can be measured through the meshing of biometric feedback 217 relayed through IoT devices. This may involve a crowd sourcing technique of gathering available sentiment-related data through facial expression recognition (FER) metering (e.g., smartphones produce FER data by reading the participants in the collaboration session monitored by system 200). Virtually any forum setting such as an investor relations meeting, a press conference a training session (e.g., a seminar), and the like can leverage or use the system 200 and its implemented methods to detect opportunities for a useful break. The legacy method of requiring a facilitator to guess when a break is required will be replaced with knowing when and when not to introduce icebreakers or full-fledged intermissions in a session based on detected collaboration events (participants are distracted or the like). Failure to use the system 200 will effectively lead to arbitrary breakpoints (e.g., static every 45 minutes), which can unintentionally interrupt a promising interval of effective engagement in a collaboration session.

Figure 3:
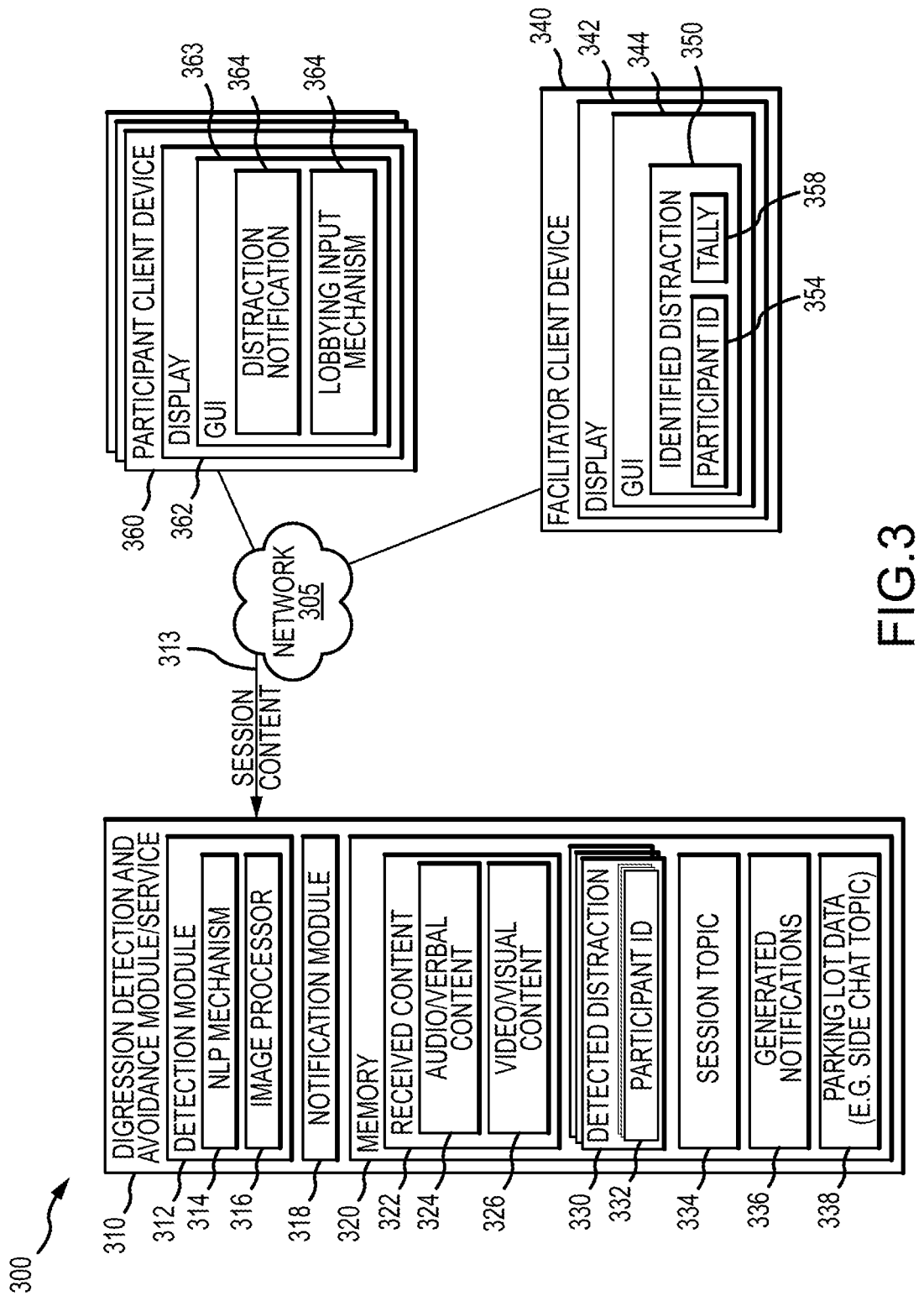
FIG. 3 illustrates a functional block diagram of a communication system (e.g., a partial implementation of the system of FIG. 1) showing more detail of the digression detection and avoidance components.

FIG. 3 illustrates a functional block diagram of a communication system (e.g., a partial implementation of the system of FIG. 1) 300 showing more detail of the digression detection and avoidance components. The system 300 includes a digression detection and avoidance module or service 310 monitoring a collaboration session, including receiving session content 313, over digital communications network 305 that run or facilitated by a facilitator operating a facilitator client device 340 and attended by one-to-many participants each operating a participant client device 360. As shown, the service 310 includes memory 320 storing a set of received session content 322 that may include audio/verbal content 324 (e.g., captured via microphones on devices 360) and video/visual content 326 (e.g., captured via one or more cameras on or linked to devices 360) captured or recorded during the collaboration session and transmitted from devices 360 over network 305 as shown at 313.

The service 310 includes a detection module or routine 312 (whose functions are provided with one or more processors running code or executing instructions) that uses a natural language processing (NLP) or other language processing mechanism 314 to process the audio/verbal content 324 to determine whether the session is remaining on topic 334 or are becoming distracted. The session topic 334 may be defined by a facilitator operating device 340 to enter the planned topic via GUI 344 in display 342 of device 340 or may be determined in real time by the detection module 312 with NLP mechanism 314. The detection module 312 further includes an image processor 316 to process the video/visual content 326 to determine in a visual manner whether one or more participants operating devices 360 have become distracted. The distraction 330 detected by module 312 via components 314 and 316 is stored in memory 330 and includes identified participants 332 (or their IDs) associated with the detected distraction (e.g., which participants are fidgeting, are involved in a side chat, and the like).

In response to distraction detection, the notification module 318 acts to create or generate notification 336, which may include parking lot data 338 (which may include the topic of any distractions that involve side chats). The notifications 336 are used by service 310 to notify the facilitator via device 340 by displaying a prompt/window 350 pertaining to the identified distraction, and this may include participant IDs 354 for those digressing from the session topic 334. In some cases, the window/displayed data 350 may include a tally or count 358 for each participant 354 indicating it is there first digression, second digression, and so on, and this tally 358 can be used by the facilitator to determine when they want to manually bring the digression up within the session or when they want the service 310 to notify the participant(s) to try to avoid the digression. The avoidance may involve the notification module 318 transmitting a notification 336 to the participant devices 360 involved in the digression to provide a distraction notification 364 and/or a parking lot interface/pop up 366 in their GUI 363 of the device's display 362. The distraction notification 364 may simply send them a note/message indicating they should stay on topic or otherwise encouraging that the distraction/digression be ended while the parking lot interface 366 may identify a digression topic and ask them whether or not they would like to "park" this topic and discuss at a later collaboration session (which can be scheduled during the ongoing collaboration session).

In implementing the system 300, it will be understood by those skilled in the arts that there are many methods that may be used by detection module 312 in detecting digression (e.g., a collaboration event) during a monitored collaboration session. The NLP mechanism 314 or other devices may be used for detection of linguistic expressions in content 324 as a signal of use of an unnecessary remark or comment on the session's topic 334 to identify a digression/distraction 330. The NLP mechanism 314 may also be used to detect lexical chains for a particular discussion and detection of keywords used for a particular topic, which both can be used by the detection module 312 during detection of digression 330.

During use of system 300 to monitor a collaboration session (e.g., when a meeting initiates), the system 300 via service 310 detects and addresses linguistic-based distractions through the NLP mechanism 314 and its implemented methods. Also, during the meeting, when the system 200

(via image processor 316) observes any participant is not in optimal camera view or is distracted when they should be listening to the facilitator, the system 300 provides a notification (via notification module 318 and with varying degrees of alertness configurable by facilitator via GUI 342) to the participants (as shown at 364 and 366) or the facilitator (as shown at 350, if enabled by the facilitator) about a visual distraction 330 with a message (e.g., a message to the effect "please stay focused during the meeting" or the like).

When the system 300 determines that there are disparate conversations amongst the participants operating devices 360, it may generate (with module 318) a popup 364 to the participant, which can ask whether the distraction/digression 330 is related to the meeting agenda (e.g., topic 334) or not. The system 300 also may provide an option to share an alert to the facilitator of the identified distraction or separate conversation (identified via linguistic analysis, for example) as shown at 350 in GUI 344 of facilitator client device 340. If the participant thinks the occurrence of the system-detected distraction 330 is related to the current discussion agenda 334, the system 304 may present the option via popup/interface 366 of a topic parking lot (defined by data 338) to the participant. In the conversation parking lot popup/interface 366, the participant can be provided with the choice to schedule the discussion after the current meeting. The parking lot interface 366 may also give authority to the participant to inform the facilitator via GUI 344 about the side discussion/topic during the collaboration session.

As will be understood from the discussion of the system 300, the service 310 may be useful in a wide range of applications and environments. Video conferencing is not only used in corporate organizations but in many different industries. For example, the education industry is rapidly expanding its use of video classrooms. Classrooms are now online that teachers use to give video lectures, but the teachers often are not able to understand whether or not the students are focused on the lectures. The solution provided by the system 300 can help teacher to notice the distracted student in real time as well as give an enhanced remote classroom experience that more closely replicates the physical one. The system 300 may also be used in video interviews with the system 300 allowing the interviewer to more readily detect digression by the interviewee and whether there are any queries from the interviewee (e.g., a job candidate), which can be parked for later discussion (e.g., a later collaboration session). The module/service 310 may be used in other environments such as within a vehicle to detect when conversations involving the driver or passengers may reach a level that could result in an unsafe distraction of the driver and also be used to ensure video is disabled (audio only) for a client device 360 used to participate in an online collaboration session while driving a vehicle.

Figure 4:
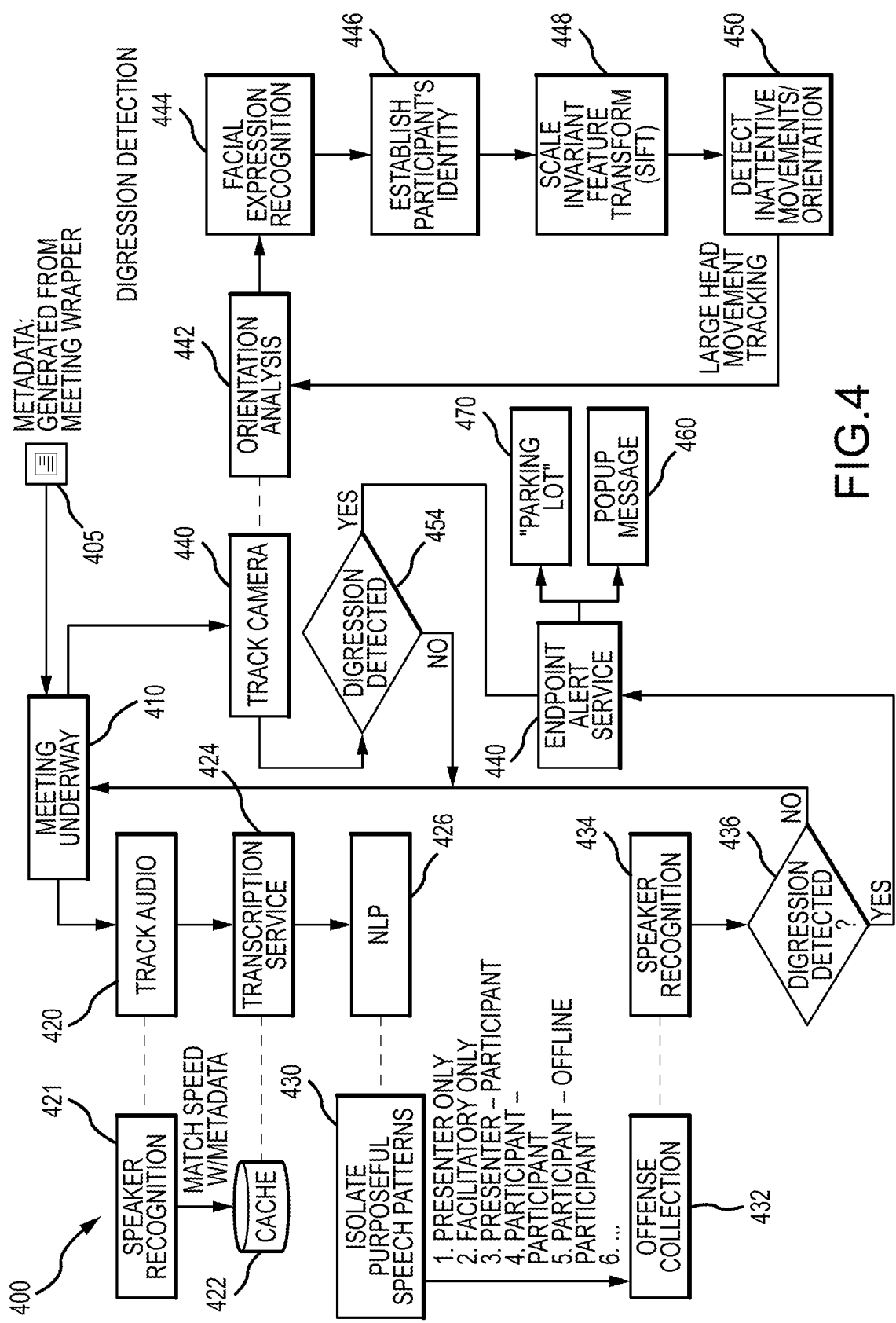
FIG. 4 is a flow diagram of a method carried out by operations of the systems of FIGS. 1 and 3 to identify and limits distractions during a collaboration session.

FIG. 4 is a flow diagram of a method 400 carried our by operations of the systems of FIGS. 1 and 3 to identify and limits distractions during a collaboration session. As shown at step 410, session content 405, including metadata generated from a meeting wrapper, is gathered while the meeting is underway (or "live" or real time data collection). The audio and video components are concurrently processed in method 400 as shown with tracking audio 420 and tracking images from camera(s) 440. At 424, a transcription service is used to transcribe session audio content, which is then output for NLP processing 426. Concurrently, speaker recognition may be performed at 421 to produce a cache 422 matching speech in the content with metadata (which can provide a participant ID). This results with outputting at 430 isolated purposeful speed patterns (which may be present only, facilitator only, presenter to participant, participant to participant, and/or participant to offline participant). At 432, possible offenses/distractions are collected for processing including the speech patterns, and, at 434, these are matched with particular speakers/participants (e.g., using cache formed at 422). Then, at 436, the method 400 includes determining whether or not a digression from session topic has occurred or been detected. If not, the method 400 continues at 410. If yes, the method 400 continues with providing the detected distraction along with participant IDs to an endpoint alert or notification service at 440.

At 440, output of cameras in the session are tracked. This may involve orientation analysis at 442 followed by facial expression recognition (is participant paying attention to topic and so on) at 444, by establishing a participant's identity at 446, by performing large head movement tracking at 448 (such as using Scale Invariant Feature Transform (SIFT) techniques), and by detecting inattentive movements/orientations at 450. Then, this image tracking/processing from step 440 is output to determine at 454 for detection of a distraction or digression from session topic. If none is detected, the method continues at 410. If distraction is found at 454, the method 400 continues at 440 by passing the distraction and participant IDs to an endpoint alert service. The endpoint alert service 440 is configured to provide a notification of distraction popup at 460 in the participant's device (and, in some cases, in the facilitator's device) and/or at 470 with providing a parking lot interface to the participant (e.g., to park this digression topic and take it up at a later session that can be scheduled in step 470 in this interface).

At this point in the description, it may be useful to discuss in more detail operations of the session highlight reel generation tool/module 136 of the system 100 of FIG. 1 in creating the session highlight reel 144. The highlights/reel 144 may be made available to participants to allow them to "rewind" and run through the content and the experience of a collaboration session (during the session or after the session has ended). Traditionally, once the capture is complete, a system would share a link to the recorded meeting with the participants. However, the linked recording has no tags indexing the data/content and no search or browse features. Hence, the prior approach of simply recording the entire session does not allow the user to quickly recall important things shared during the discussion such as which participant has said what during which time during the session. The user must manually drag the navigation control to guess the timing of a particular event until they find it. The participant had to rerun the entire meeting again to get their answers in many cases, which led to spending unnecessary time and resources. Additionally, many users of conventional recordings did not even bother to watch the recording because it was time consuming to find what they were looking for and the medium was not engaging or interactive.

The new tool/module 136 provides tags and/or annotations to session content in the highlight reel 144 to share the context and quantitative features of the meeting including, but not limited to: (a) characteristics of the participants' attentiveness, contribution, shared media, timestamps of mute/unmute meeting, audio/video issues, Internet connection/disconnection, other app notifications on the system, disturbance, snapshots of shared media, disable/enable video, and so on; (b) who attended the meeting, when the meeting was started, attendance issues, audio/video issues during the meeting, and so on; (c) advance video/audio indexing (e.g., applying tags) to allow a user to easily review meeting highlights; and (d) integration of various types of data collecting devices such as cameras, microphones, and so on with advanced software technologies.

Particularly, the highlight reel 144 can include tags or indexing to allow a user/participant to quickly navigate to important collaboration events such as knowing each participant's attention level, interest, and mood at various times during the meeting such as by using a facial expression recognition engine or the like. An analysis module (part of tool/module 136) may be used to determine: (1) exclusive topics discussed during the meeting; (2) each participant's entry and exit timings; and (3) quality of audio, video, and network connection parameters. Each of these collaboration events may be tagged or indexed to appropriate portions of the content in the highlight reel 144. The analysis module may act to convert the shared content of the session into machine readable content, and then the analysis module can index and tag this shared content over the meeting. The analysis module may further determine each participant's contribution or expertise level during the session by analyzing the contribution of each participant of the session. A NLP module or other tool may be included to convert machine readable content to a readable content.

The new method carried out by tool/module 136 and/or system 100 of FIG. 1 enhances and makes each virtual meeting or collaboration session more productive and actionable. The method creates a real-time transcription and a highlight reel of all important events. The reel is configured to enable the participants (including ones who missed all or portions of the meeting) to watch and listen to critical meeting moments (which they can select or identify) in a fraction of time compared with simple meeting recordings. The method manages all of the important information, which is shared during the meeting, while allowing participants to easily assign and track action items. The method includes recording all the events that are underway and transcribing the audio recording and using video facial recognition technology to identify the participants in the meeting.

The method includes creating a highlight reel of important events such as a time when each participant spoke, a beginning of each presentation, when a participant joins or exists the meeting, and when a new topic is introduced. The method is adapted to allow the virtual communication solutions to easily integrate with advanced technology like AI-based technology with data capture devices like cameras to detect the face of the participant to know their identity and their attention at differing times in the meeting. The AI technology along with the use of NLP is used to make the meeting, via the new highlight reel, more engageable and while transcribing the whole meeting in real time. The method makes video meetings more collaborative by adding tags of different media events on important moments during the meetings.

The highlight reel 144 may be configured to provide links that allow users to jump to specific moments in the reel and allow late (or distracted) participants to catch up quickly. The participants may be enabled to manually tag reels 144 to allow follow up at specific meeting moments (and topics under discussion at that point in time in the meeting). The "session" may be nearly any recorded event including a sporting event (e.g., to provide real time unfolding of events related to a main event such as player changes, statistics, and so on), a political debate (e.g., to provide more than just real time audience polling the tool can provide multiple feeds for each debater, statistics, and reel-based interactions), and online gambling (e.g., to provide statistics, multiple players, status of players and the game, and so on).

Figure 5:
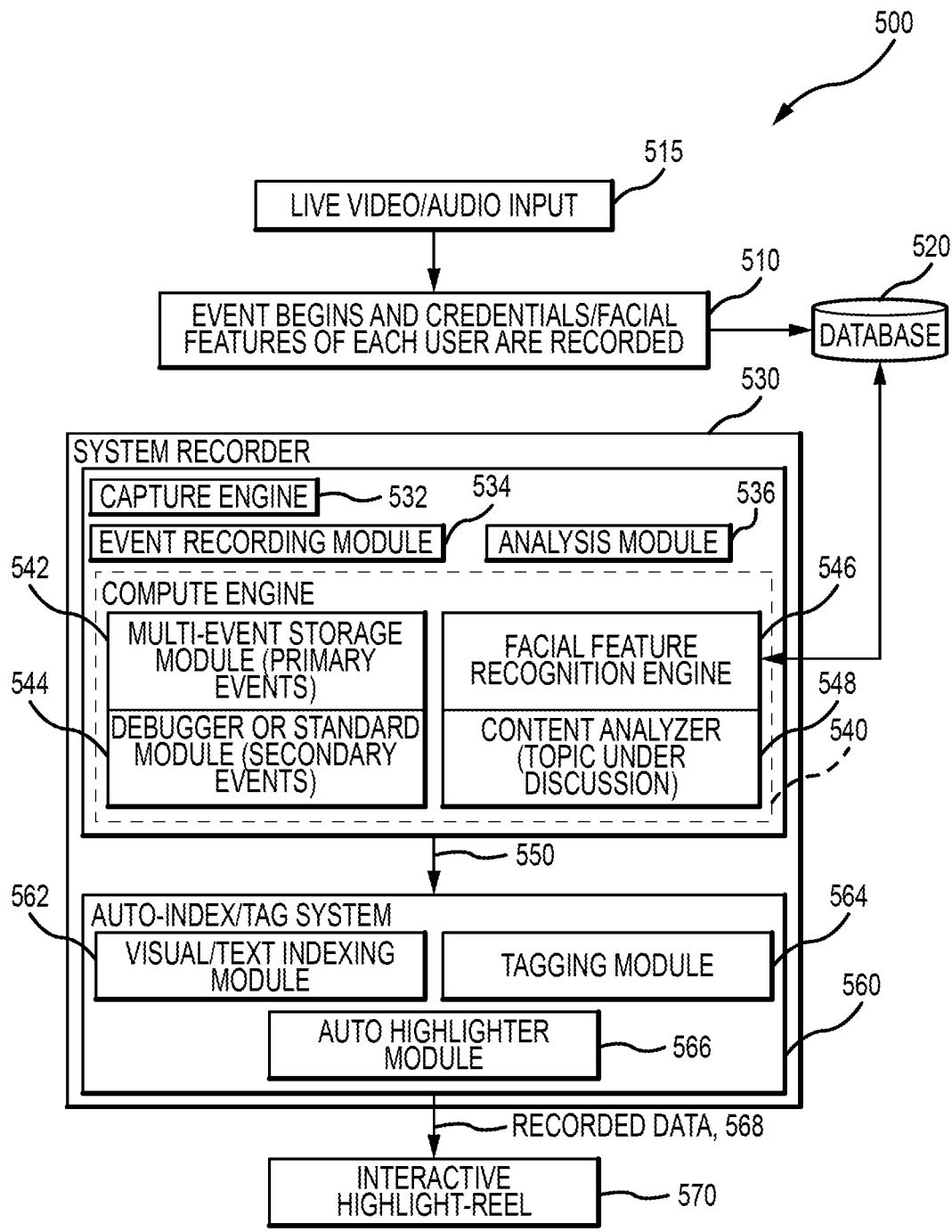
FIG. 5 is a flow diagram showing data flow in a communication system during highlight reel generation during a collaboration session.

FIG. 5 is a flow diagram showing data flow in a communication system during highlight reel generation 500 during a collaboration session. The method 500 provides highlight reel meeting output 570, which is interactive and includes important meeting moments (or all moments with an ability to navigate quickly to system-defined important or tagged moments). The reel 570 can be provided to participants during the meeting (or after the meeting), and reel 570 may include different media events such as slides displayed during the presentation (e.g., video content), audio content, public chat instances, and the order in which each participant joins and exits the meeting.

As shown, step 510 involves the collaboration session or meeting beginning (e.g., with participants logging into a meeting application) and live video/audio input is collected as shown at 515 and stored in memory/database 520. Step 510 may include the system recording (e.g., with system recorder 530) credentials and/or facial features of each participant. The recording may be performed by the system recorder 530 via its capture engine 532 and event recording module 534, which start a multiple-event recording of the meeting including: (a) onboarding and exiting events; (b) meeting content (presentations start/stop, title, content, and so on); (c) audio/video; (d) endpoint quality (e.g., double talk jitter, no audio, signal-to-noise ratio, and so on); and (e) network issues.

The analysis module 536 is activated (and may call compute engine 540) to create a real time transcript and to detect the identification of participants and analyze topics under discussion during the collaboration session. The compute engine 540 includes a module 542 for storing (e.g., identifying and tagging/indexing) primary events in the reel 470 and a module for storing secondary events in the reel 470. Further, the compute engine 540 uses a facial feature recognition engine 546 to detect the facial biometrics and expressions of each participant of the collaboration session. Then, sentiment indicators can be tracked for each identified participant in the feed in real time. Also, bookmarks can be added to the highlight reel based on the expressions (including sentiment indicators) for each participant. The compute engine 540 is further shown to include a content analyzer 548 that processes the input 515 of the session to determine the present topic under discussion, which be tagged, indexed, or bookmarked in the reel 570 (when did each topic begin and end in the session).

The system recorder 530 includes the auto-index/tag system 560 for processing the output of the analysis module 536 and compute engine 540 to provide recorded data 568 with tags/indexes and annotations to create the interactive highlight reel 570. The system includes a visual/text indexing module, a tagging module 564, and an auto highlighter module 566 to provide the indexing, tagging, and highlighting/annotating features of the highlight reel 570. Auto indexing and tagging of the content 515 is performed over time and may include each participant's name, topic, and other information identified or generated by the analysis module 536 and compute engine 540. Auto highlighting by module 566 may include highlighting parts determined to be important in the content shared by participants in the meeting.

In practice, the individually recorded events are sequenced together to form the reel 570 using timestamps. Users can then use the reel 570 to review the entire meeting using a "zoom in" and "zoom out" capability that acts as a quick catch up option to allow them to accelerate through the reel 570 to avoid wasting time while recapping missed portions or portions deserving further review. Additionally, during the session, important topics (identified by participants or automatically by the system) can be highlighted by tagging them with a timestamp or the like. So, instead of watching a recorded video of a session in full, users can click on the timestamp or other tag/index directly and listen/view the relevant highlights only.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

From the above description, it will be understood that some preferred implementations of a communications system will be configured to provide fatigue detection and provide icebreaker and/or other break generation during collaboration sessions. Office environments, both virtual and physical, suffer from meeting overload and are coming to terms with how meetings could be run more effectively. An agenda for a meeting or collaboration session may be set by a facilitator, but certain factors can lead to ineffective meetings such as a larger number of participants, session duration, and the monotony of the session itself (e.g., due to content or abilities of the facilitator themselves). The system described herein is unique in that it offers tools to bolster the meeting's effectiveness through the facilitated introduction of well-timed breaks (including icebreakers) in real-time (i.e., during the session).

To this end, the system in some embodiments is configured to mine break-relevant (or detection) data during the collaboration session. The system then processes this data to produce key metrics, and the system uses these metrics to determine when is a good or even a best time to schedule a break. The facilitator is either advised by the system of this recommended break time (and, in some cases, the type of break to take) or can override (e.g., via their configuration interface) to manually recommend when a break should be taken/initiated in the current collaboration session. Meeting efficiency rides on the participants' collective "roll" on productivity, focus, and engagement. With this in mind, the system is adapted to achieve a more optimal knowledge transfer during the meeting by enhancing when participants get the breaks they deserve and want. Additionally, the new collaboration session monitoring system produces meetings/sessions with greater shared knowledge and versatility in the group because their attention spans are greater due to timely breaks. The type of breaks may include typical "back in 5 (or 10 or 15 or the like) breaks" as well as icebreakers or scheduled intervals to debrief (as opposed to those for rest, nourishment, and so on).

We claim:

1. An electronic communication system comprising:
during a collaboration session involving a facilitator client device and a plurality of participant client devices communicating over a digital communications network, a data storage system storing session content captured for the collaboration session;
a collaboration engine, provided by a web server, communicatively linked to the data storage system via the digital communications network, including one or more processors running or executing code to provide functions of the collaboration engine, processing the session content during the collaboration session to identify a collaboration event indicating at least one of a desirability of a break in the collaboration session and a digression from a topic of the collaboration session; and
a notification module, after the collaboration event is identified by the collaboration engine, generating a prompt that is communicated over the digital communications network to the facilitator client device or at least one of the plurality of participant client devices,
wherein the collaboration event is indicative of the digression from the topic of the collaboration session,
wherein the collaboration engine comprises a digression detection tool concurrently processing audio portions and video portions of the session content to identify the digression and to identify one or more operators of the participant client devices associated with the digression, and
wherein the prompt is presented on the facilitator client device and includes a display of the identified one or more operators along with a distraction count tallying a number of distractions during the collaboration session for each of the identified one or more operators and with an input mechanism allowing an operator of the facilitator client device to initiate transmission of a digression notice to the one or more operators.

2. The electronic communication system of claim 1, wherein the collaboration event is indicative of the desirability of the break, wherein the collaboration engine comprises a break generation tool defining a time for the break in the collaboration session and defining a break type for the break.

3. The electronic communication system of claim 2, wherein the break type is an intermission in the collaboration session or is an icebreaker to be presented during the collaboration session.

4. The electronic communication system of claim 2, wherein the prompt is presented on the facilitator client device via a configuration interface allowing an operator of the facilitator client device to initiate the break or to modify the time for the break or the break type.

5. The electronic communication system of claim 2, wherein the prompt is presented on the plurality of participant client devices and includes a display of the time for the break and the break type.

6. The electronic communication system of claim 2, wherein the session content comprises biometric data pertaining to operators of the participant client devices and wherein the break generation tool processes the biometric data to identify one or more predefined biometric parameters associated with the desirability of the break including fatigue and distractedness.

7. The electronic communication system of claim 2, wherein the collaboration event is an identified level of participant distractedness linked to at least one of side chats, ambient noise levels, and silence during the collaboration session.

8. The electronic communication system of claim 2, wherein the collaboration event is receipt of lobbying data from the participant client devices requesting the break and wherein the break generation tool processes the lobbying data to determine when a predefined threshold value is exceeded.

9. The electronic communication system of claim 1, wherein the prompt is presented to the one or more operators on associated ones of the participant client devices and includes at least one of a message regarding the topic of the collaboration session and an invitation to park a side topic, identified by the digression detection tool as being associated with the digression, during a remainder of the collaboration session and schedule an additional collaboration session for the side topic.

10. The electronic communication system of claim 1, further comprising a highlight reel generation tool processing the session content to generate an interactive highlight reel that is indexed, tagged, or highlighted based on the collaboration event.

11. The electronic communication system of claim 10, wherein the prompt is presented on one of the participant client devices and provides a link to the interactive highlight reel.

12. The electronic communication system of claim 10, wherein the collaboration event is selected from the group consisting of: a participant's attention level, interest, or mood as determined using a facial expression recognition engine; a discussion topic during the collaboration session; a participant's entry and exit timings; quality of audio, video, or the digital communications network connection parameters; content shared during the collaboration session; and a participant's contribution during the collaboration session.

\* \* \* \* \*